(12) United States Patent
Bruas

(10) Patent No.: US 8,218,700 B2
(45) Date of Patent: Jul. 10, 2012

(54) METHOD FOR SYNCHRONISATION AND CONTROL IN WIRELESS COMMUNICATION SYSTEMS

(75) Inventor: Patrick Bruas, Livry Gargan (FR)

(73) Assignee: Thales (FR)

(*) Notice: Subject to any disclaimer, the term of this patent is extended or adjusted under 35 U.S.C. 154(b) by 983 days.

(21) Appl. No.: 11/912,254

(22) PCT Filed: Apr. 20, 2006

(86) PCT No.: PCT/EP2006/061689
§ 371 (c)(1),
(2), (4) Date: Jul. 30, 2008

(87) PCT Pub. No.: WO2006/111554
PCT Pub. Date: Oct. 26, 2006

(65) Prior Publication Data
US 2008/0285627 A1    Nov. 20, 2008

(30) Foreign Application Priority Data
Apr. 22, 2005 (FR) ...................................... 05 04074

(51) Int. Cl.
*H04L 7/00* (2006.01)

(52) U.S. Cl. ...................................................... 375/354

(58) Field of Classification Search .......... 375/132–133, 375/135–136, 211, 219–220, 226, 356, 354; 370/315, 350
See application file for complete search history.

(56) References Cited

U.S. PATENT DOCUMENTS

| | | | |
|---|---|---|---|
| 3,588,703 A * | 6/1971 | Sorkin et al. .................. | 375/358 |
| 4,292,683 A | 9/1981 | Jueneman | |
| 4,811,365 A | 3/1989 | Manno | |
| 4,918,609 A * | 4/1990 | Yamawaki ..................... | 701/207 |
| 5,321,722 A * | 6/1994 | Ogawa .......................... | 375/222 |
| 5,878,034 A | 3/1999 | Hershey et al. | |
| 5,910,945 A * | 6/1999 | Garrison et al. .............. | 370/324 |
| 6,127,967 A | 10/2000 | Ghazvinian et al. | |
| 6,639,902 B2 * | 10/2003 | Mennekens et al. .......... | 370/280 |
| 2003/0147362 A1 * | 8/2003 | Dick et al. ..................... | 370/324 |

* cited by examiner

Primary Examiner — Khanh C Tran
(74) Attorney, Agent, or Firm — Lowe Hauptman Ham & Berner, LLP

(57) ABSTRACT

Method and device making it possible to synchronize a master station and one or more subscriber stations in a wireless communications network, comprising at least one processor disposed at the level of each of the subscriber stations and suitable for calculating each subscriber's transmit time adjustment by taking account of the rate of variation of the satellite-subscriber path, a master station side processor suitable for measuring the loop error and a processor suitable for comparing the value of the error with a threshold value and as soon as the loop error value for a subscriber station is less than or equal to the threshold value, for giving said subscriber station permission to send its traffic.

3 Claims, 7 Drawing Sheets

METHOD FOR SYNCHRONISATION AND CONTROL IN WIRELESS COMMUNICATION SYSTEMS

CROSS-REFERENCE TO RELATED APPLICATIONS

The present Application is based on International Application No. PCT/EP2006/061689, filed on Apr. 20, 2006, which in turn corresponds to French Application No. 0504074, filed on Apr. 22, 2005, and priority is hereby claimed under 35 USC §119 based on these applications. Each of these applications are hereby incorporated by reference in their entirety into the present application.

FIELD OF THE INVENTION

The invention relates notably to a method of synchronization in wireless communications and notably in the field of satellites where one seeks synchronization and slaving between a network timing master station and a telecommunications network subscriber.

BACKGROUND OF THE INVENTION

It is used notably in the field of telecommunications using an OFHMA (Orthogonal Frequency Hopping Multiple Access) waveform.

In the field of telecommunications using waveforms of OFHMA type, orthogonality is usually ensured by time distribution and maintenance of master-slave type which contrives matters such that the instants of arrival of all the carriers sent by the ground segment in the same repeater are synchronous at the satellite, doing so with a synchronization precision that is much better than the duration of the dead time of the FH (frequency hopping) waveform. This guarantees zero self-jamming of the network and therefore better network capacity. The time management is therefore of centralized type.

The means generally used to fulfill the above orthogonality condition is a slaving loop between the timing master of the network and each subscriber (slave) of the network.

Given the latency of the slaving loop, any Transit Time variation due to the motion of the satellite (for example, the inclination of a few degrees of the orbital plane which creates the famous "eight" of the satellite) or of the carrier (for example, the speed of the vessel) in a $1^{st}$-order control loop manifests itself as a steady state with a loop error incompatible with the synchronization precision demand required by the orthogonality condition.

The dual problem to be solved is therefore to ensure a satisfactory loop convergence time, at the same time as a zero or quasi-zero steady state loop error, with a correct stability margin. Specifically, the convergence time of this control loop is a predominant element in a station's network re-entry time performance.

It is known from the prior art to use second-order slaving to zero this loop error. However, this is done to the detriment of the convergence time of the loop which will increase significantly to maintain a sufficient stability margin of the slaving loop. The drawbacks of the second-order slaving solution are notably its complexity and principally the lengthening of the convergence time.

Significant overshoot with a great deal of chatter may also arise for certain adjustments of loop gains.

SUMMARY OF THE INVENTION

The method according to the invention uses notably an additional information item which is the rate of variation of the satellite-carrier path enabling the long loop of a subscriber to be made to converge to zero. This rate of variation is found, for example, by calculating the derivative of the temporal position of receipt of the FH service link termed the "timing beacon", which is sent by the master of the time by permanent broadcasting to all the subscribers of the network.

The invention relates notably to a method of synchronization in a transparent satellite telecommunications system comprising a master station and one or more subscriber stations, the system using a waveform of orthogonal frequency hopping type to exchange information, a subscriber and the master exchanging time request and time response messages, the transmit time of each subscriber being controlled by a long loop driven by the master in such a way that all the signals of the network arrive substantially synchronous in the repeater of the satellite, the master station determining the loop error $\Delta B(n)$ of a subscriber by determining the shift between the instant of receipt of the subscriber station's time request and the instant of receipt of its own timing beacon, characterized in that:

a subscriber station takes into account the shift value (loop error) received in the time response and the rate of variation of the satellite-carrier path deduced from the receipt of the timing beacon, to undertake an adjustment of its transmit time for the new time request, and in that the master station or a subscriber station compares the value of the measured loop error with a threshold value and as soon as the loop error value for a given subscriber station is less than or equal to the threshold value, the master station gives said subscriber station permission to send its traffic.

The transmit time which makes it possible to zero the steady state loop error is determined for example by implementing at each loop round (that is to say each time request/response exchange) the following algorithm:

$$T^B\text{tra}(n+1)=T^B\text{tra}(n)-\text{Go }B(n-k)-C(n) \quad [E3]$$

where

Go is the loop gain

C(n) a correction term which here estimates the variation in the satellite-subscriber path and which according to the algorithm of the invention is equal to:

$$C(n)=T\text{rec}(n)-T\text{rec}(n-1)$$

$T^B$tra: transmit time of the subscriber station

B(n) loop error for the subscriber station B

Trec: time of receipt by the subscriber, of the timing beacon sent by the master "k": latency of the loop expressed in number of loop rounds=duration which separates the measurement of the shift from the consideration of the adjustment.

The step of comparing the loop error with the threshold value is executed for example over several consecutive loop rounds.

The threshold value is for example chosen less than the duration of the dead time of the waveform.

The waveform is for example an OFHMA waveform.

The invention also relates to a device making it possible to synchronize a master station and one or more subscriber stations in a wireless communications network, comprising at least one processor disposed at the level of each of the subscriber stations, a processor being suitable for calculating each subscriber's transmit time adjustment by taking account of the rate of variation of the satellite-subscriber path, a processor disposed master station side, suitable for measuring the loop error and a processor adapted to compare the value of the error with a threshold value and, as soon as the loop error value, for a subscriber station, is less than or equal to the threshold value, for giving said subscriber station permission to send its traffic.

The processor adapted to compare the value of the loop error with the threshold value is disposed in the master station or on a subscriber station.

The invention exhibits notably the following advantages: it allows a substantially identical convergence time to that of a first-order control loop while ensuring a zero loop error compatible with the orthogonality criterion.

A station's network re-entry time performance is significantly improved. The idea is simple to implement. The stability of the loop is better.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

To summarize, the idea of the invention consists notably in using an additional information item, for example the rate of variation of the subscriber side satellite-carrier path, to obtain faster synchronization of the loop. This information can be obtained by calculating the derivative of the temporal position of receipt of the FH link termed the "timing beacon" which is sent by the master of the time by broadcasting to the subscribers of the network.

This involves, notably for this timing beacon, permanent broadcasting of time that is synchronous (termed full-FH) and implicit (no Time-Of-Day explicitly transported). All the subscriber stations or users of the network have their traffic reception time slaved to this timing beacon. The subscribers are, for example, communication units, UC, (modulators which each send a traffic carrier). For a station, there are one or more UCs which send in the same repeater and which each need to be slaved independently by the master so as not to self-jam.

Generally, the method according to the invention can be used in any orthogonal FH system (OFHMA) of master-slave type or any other system using a waveform exhibiting characteristics similar to those of the OFHMA waveforms.

The orthogonal FH technique (OFHMA) consists, in the context of SATCOM telecommunication links, in temporally and frequentially synchronizing all the frequency hopping dead time which arrive in the repeater of the satellite, in such a way that the overlap between 2 d wells (Hopping pattern) is smaller than the duration of the dead time of the FH waveform.

Given the motion of the GEO satellite (the famous eight) and/or the motion of the carrier of the station of the terrestrial segment, it is necessary to have a master of the time (station NC="Network Controller") which slaves all the transmissions of the subscribers (stations NM="Network Member") of the network with as many long loops as there are subscribers, so as to comply with the orthogonality criterion and therefore to zero the self-jamming of the network to gain capacity.

Figure 1:
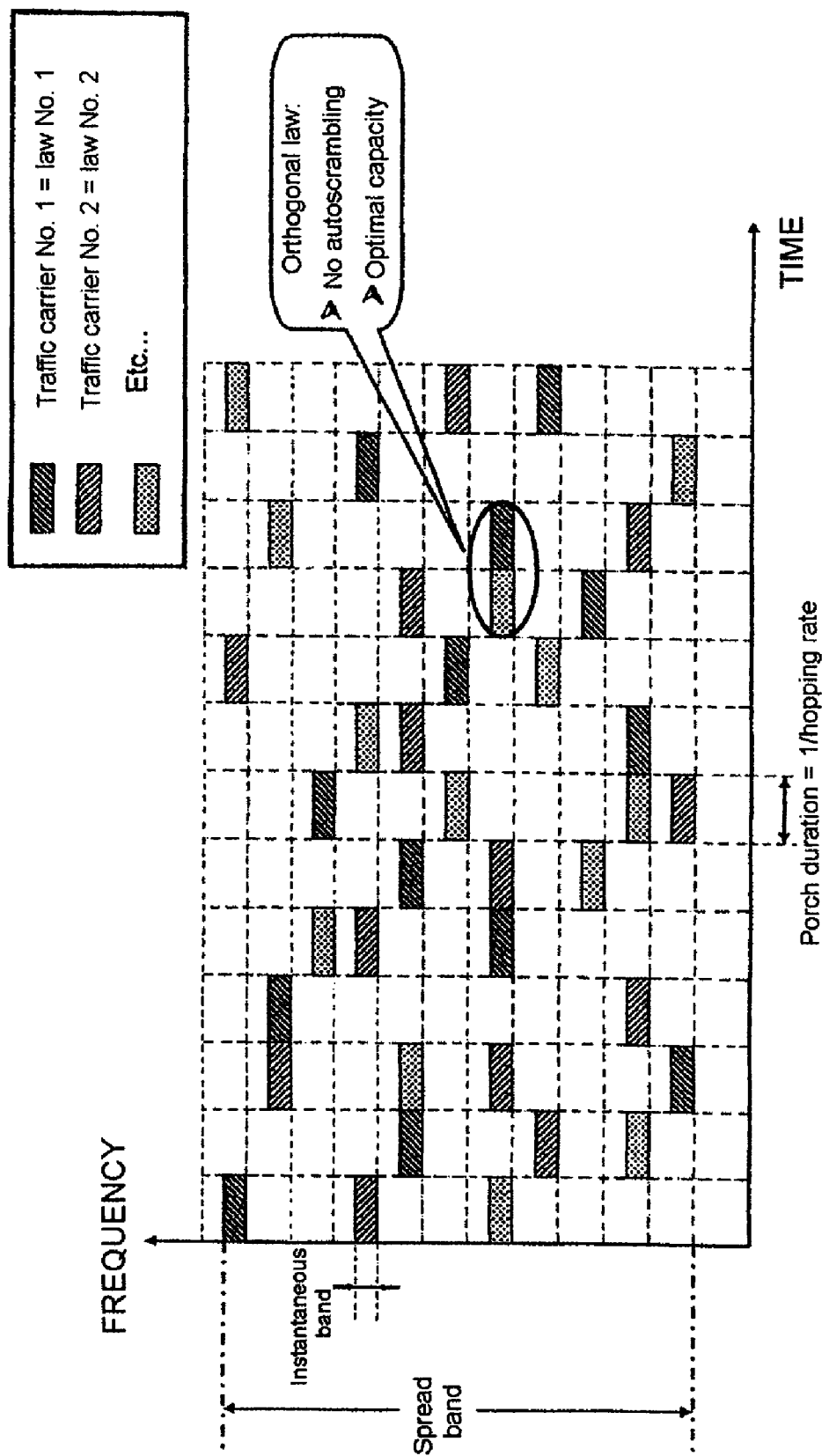
FIG. 1, a representation of the orthogonal FH (EVF) laws.

FIG. 1, orthogonal FH Laws (OFHMA), shows in a time-frequency chart, a set of traffic links which share the same spreading band, without mutually jamming one another.

The master of the time (station NC) sends an FH permanent timing beacon which arrives at the satellite at the system time Ho. The spread band of the FH can occupy one or more repeaters of the satellite. This station NC maintains the system time notably with the aid:

of a timing reference Ho (for example, the international time scale "GPS time" or that of the Universal Coordinated Time "UTC" modified to eliminate it of the intercalatory seconds and derive a continuous time scale therefrom), of a fine estimation of its transit time TT (for example, the measurement of TT by short loop).

Figure 2:
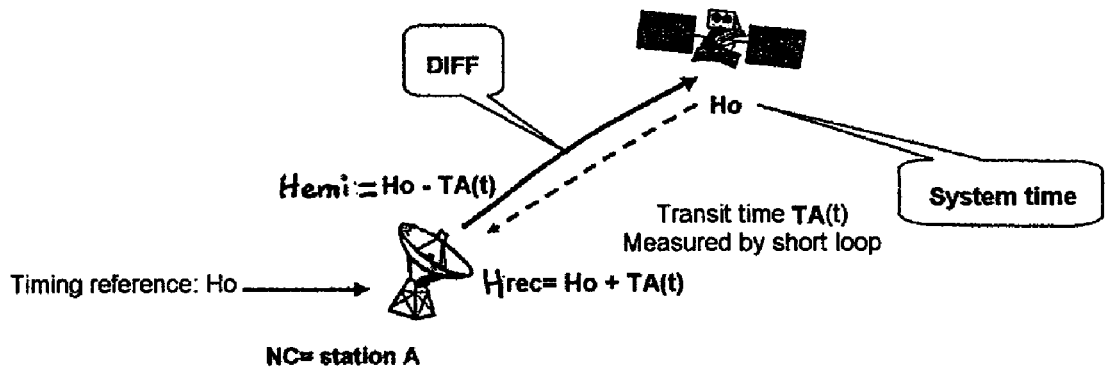
FIG. 2, the representation of a synchronous time broadcasting channel.

This system time defines the reference time of the network. It is a standard time chosen by convention between all the subscribers of the network to carry out time acquisition and allow interoperability. This permanently broadcast timing beacon channel is denoted DIFF in the description. FIG. 2 illustrates the full-ECCM synchronous time broadcasting channel.

Master side of the time, given that the transit time between the master station NC and the satellite varies over time, this variation is compensated by controlling the transmit time Hémi of the master station NC to the transit time TT measurement obtained by short loop (example: by listening to its own DIFF channel). This allows the master station NC to maintain the instant of arrival of the DIFF at the satellite at the time Ho.

Figure 3:
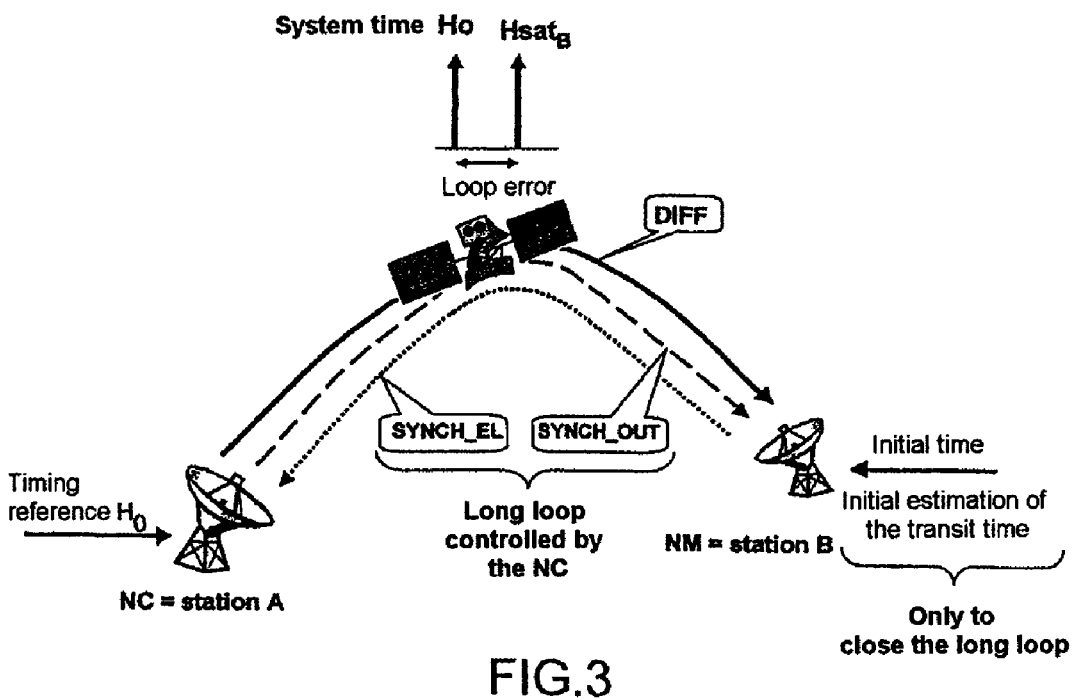
FIG. 3, a schematic of the time acquisition by long loop.
Figure 4:
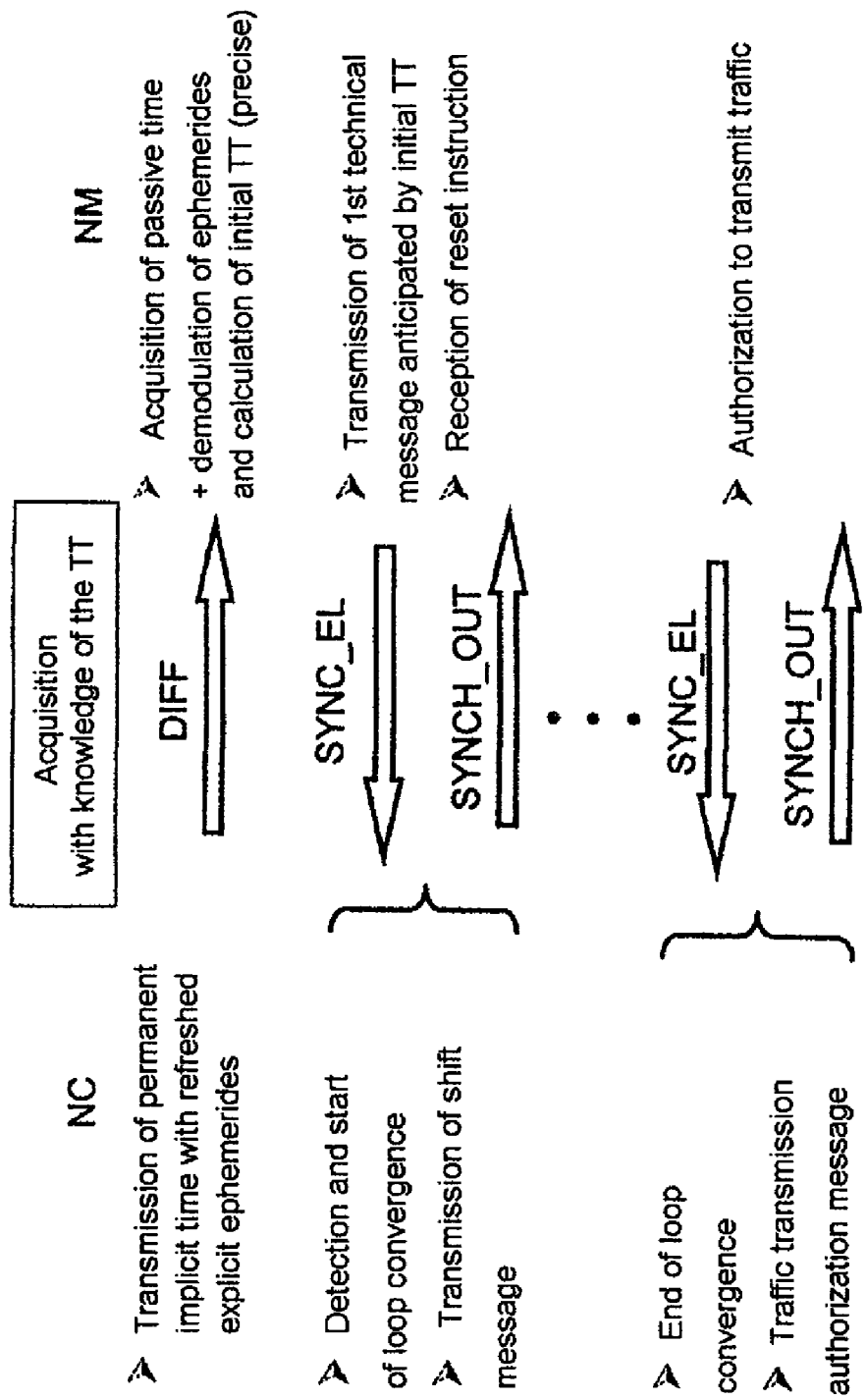
FIG. 4, the steps implemented.

FIG. 3 is a schematic of the time acquisition by radio and FIG. 4 brings together an example of time acquisition steps for a long loop.

Subscriber side (station NM), passive time acquisition by radio is obtained, for example, by the conventional FH lookout law technique which consists in searching for a frequency from the instant $-\Delta T$ up to the instant $+\Delta T$, corresponding to the relative temporal uncertainty between the station NM and the station NC. This temporal uncertainty encompasses a timing uncertainty and a transit time uncertainty.

To summarize, the synchronization of the subscriber stations is performed:
 on reception, by DIFF channel listening,
 on transmission, by a long control loop which is controlled by the master station NC.

Subscriber station NM side, once the DIFF channel is detected, the reception time Hrec of the subscriber station NM is adjusted and it tracks the evolution of the DIFF channel by virtue of the temporal tracking of the signal processing.

The demodulation of the reception traffic channel is permitted. Depending on the waveform, the traffic channel can be multiplexed with the DIFF channel or else the two channels occupy 2 different UC (communication units).

NC side (master station), there is a search for a time request technical message by subscriber called SYNCH_EL "link end" over a reduced search span, for example +/−200 μs, which must be compatible with the precision of the initial transit time of the station NM.

NM side (subscriber station), there is sending of a time request technical message called SYNCH_EL which is anticipated by 2×TTinit with TTinit=initial transit time estimated generally by local calculation on the basis of the satellite ephemerides (calculated centrally by the satellite control station) received with the DIFF, and of the local geographical position of the station NM.

NC side (master station), as soon as a valid message SYNCH_EL has been detected, then the NC measures the deviation between the time of receipt of the incoming message and the expected time at which it should have been received if there had been no synchronization error.

The latter expected time corresponds to the instant of receipt of the DIFF. This loop deviation ΔB(n) of each subscriber, also denoted f(t) subsequently in the document, is measured then returned with a latency τ seconds (corresponding in the implementation to the duration of several loop rounds) selectively to the NM in a time response message called SYNCH_OUT (adjusting technical message). For example, if there are 100 subscriber modems of the synchronization network, then there are 100 independent long loops driven by a master of the time, here denoted NC. This is why the nominal communication unit NC must be backed up by a reserve communication unit NC (colocated or not colocated) in the event of a fault, with automatic switchover so as to ensure continuity of the traffic services and not stop the whole network as soon as the master station NC develops a fault.

Subscriber station NM side, as soon as it receives the technical message SYNCH_OUT, it corrects its transmit time Hemi by applying a setpoint B(n) with a filtering gain and the long loop algorithm (described hereinafter) to return a message SYNCH_EL. The adjustment setpoint used is denoted B(n) in relation [E3] made explicit hereinafter.

The long loop is in a transient state during the SYNCH_EL, SYNCH_OUT message exchange until the loop converges.

The loop convergence criterion consists notably in observing a loop error under an acceptance threshold over a certain number of consecutive loop rounds.

Figure 5:
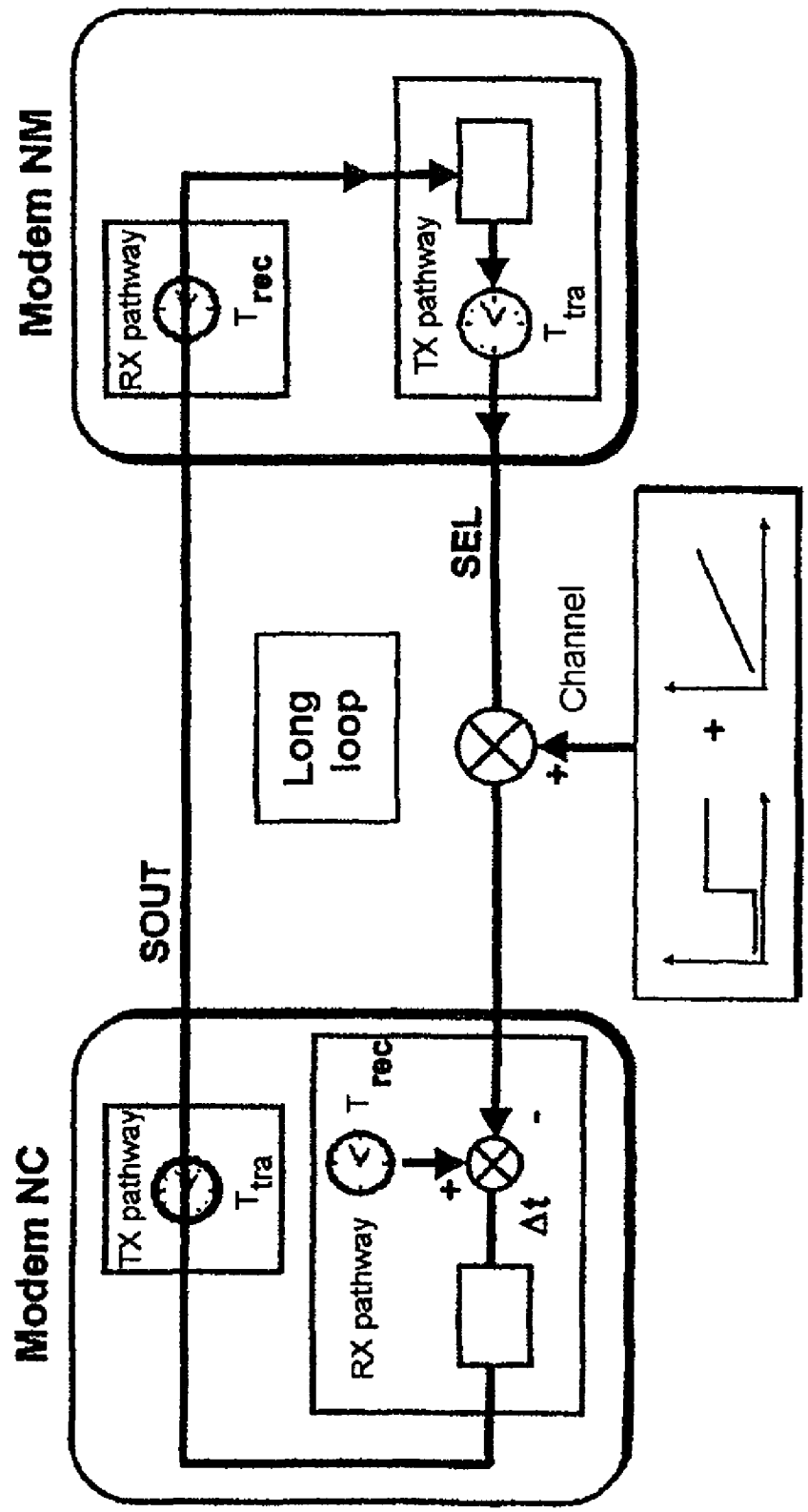
FIG. 5, an implementation of the time controlled by long loop.
Figure 6:
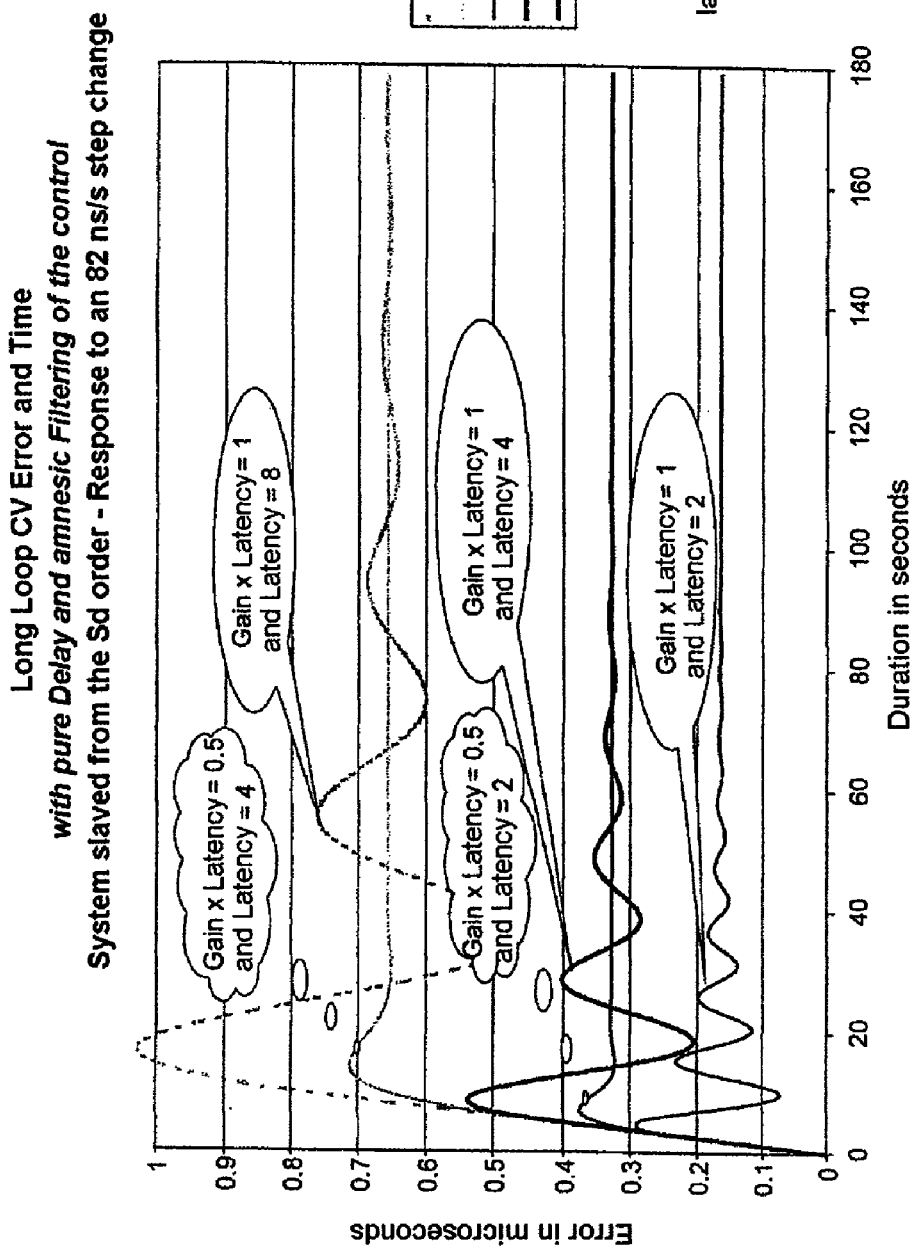
FIG. 6, a response to a step change of the long loop.

FIG. 5 shows diagrammatically an implementation of the time slaving by long loop between the modem implemented in a subscriber station and the modem of the master station of the network.

When the master station notes that the absolute value of the loop error is less than a certain threshold over for example a certain number of successive loop rounds, then the master station NC advises the subscriber station NM that the loop has converged and consequently, that the subscriber station NM is permitted to send its traffic. For this purpose, a transmission permission field is completed in the response message SYNCH_OUT by the master station NC to permit or otherwise the communication unit of the remote subscriber station NM to send its traffic.

There is then orthogonality of the links at the satellite level.

The value of the threshold is, for example, chosen in such a way that it is less than the duration of the dead time of the FH waveform.

After the transient state, the loop passes to a steady state with an error which is zero according to the algorithm of the invention (called algo_03 hereinafter).

To implement the algorithm according to the invention, each of the subscriber stations, NM, comprises for example a processor (not represented for the sake of simplification) suitable for calculating each subscriber's transmit time adjustment by taking account of the rate of variation of the satellite-subscriber path. The master station, NC, comprises a processor suitable for measuring the loop error and a processor suitable for comparing the value of the error with a threshold value and, as soon as the loop error value for a subscriber station is less than or equal to the threshold value, for giving said subscriber station permission to send its traffic.

A subscriber station can comprise a processor suitable for executing the operation of comparing the loop value with a threshold value.

The tasks of the master station and of a subscriber station are respectively the following:
  The master station NC measures a shift between the time request technical message, transmitted regularly by a subscriber station, and the expected instant. This shift is sent regularly in the response message called SYNCH_OUT,
  The subscriber station NM uses relation [E3] to perform its time adjustment,
  The master station NC compares the value of the measured shift with a fixed threshold value. Before threshold crossing, the master station prohibits the subscriber station from sending traffic. After threshold crossing, the subscriber station is permitted by the master to send its traffic. The NM not having to know the value of the threshold, only the master station knows the threshold value and decides to permit the subscriber station to send its traffic via 1 information bit contained in the message SYNCH_OUT.

The method also operates when it is the subscriber station NM which executes the operation of comparing the measured shift value.

To determine the loop error the method steps described hereinafter are implemented.

The Following Notation is Used

A and B respectively denote the stations NC (master of the time) and NM (slave station).

$$f(t) \text{ denotes the error function of the loop} = H^B\text{sat} - Ho \quad [E1]$$

or in the equivalent discretized form B(n)=f (t=nTe) with:
  Ho=system time=instant of arrival of the DIFF channel at the satellite,
  $H^B$sat=instant of arrival at the satellite of a carrier sent by station B,
  Te is the sampling period for the slaved system=duration of a loop round.

Analog Loop Equation

The error function [E1] becomes: $f(t) = H^B_{emi}(t) + T_B - Ho$ by differentiating:

$$\frac{df}{dt}(t) = \frac{d}{dt}(H^B_{emi}) + \frac{dT_B}{dt}(t) \text{ with} \quad [E2]$$

$H^B_{emi}(t)$=transmit time of station B
$T_B$=transit time of station B.

The long loop message B(n) sent by the master station NC to a subscriber station NM in the SYNCH_OUT contains the shift between the instant of receipt of the message received SYNCH_EL and the expected instant (i.e. the instant of receipt of the DIFF via the short loop).

Figure 8:
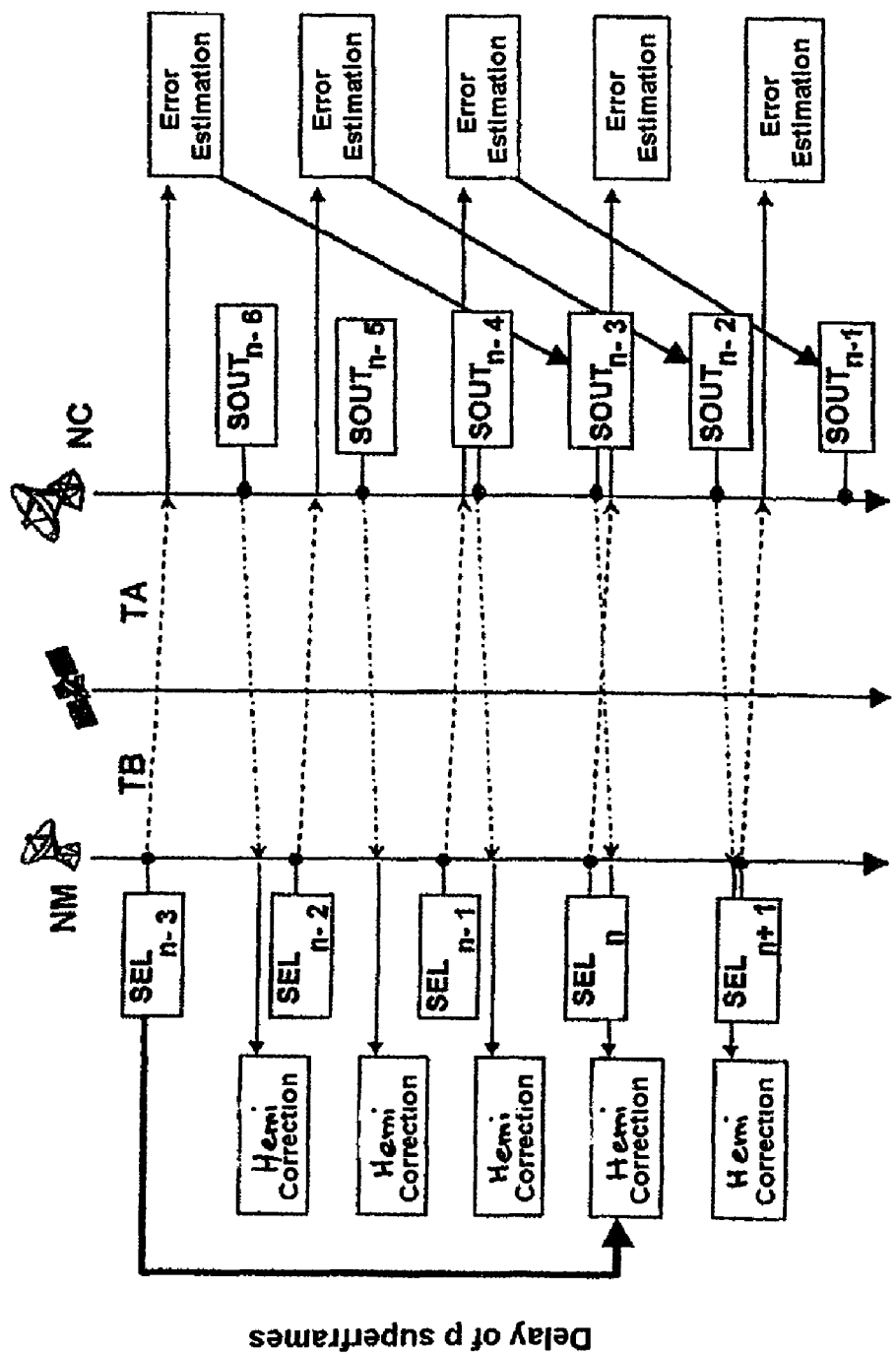

This long loop message therefore measures the orthogonality error f (t−τ) and it will be sent τ seconds later corresponding to the latency of the system with τ=k Te which is illustrated in FIG. 8.

The algorithm implemented on the side of the subscriber station B is the following:

$$H^B_{emi}(n+1) = H^B_{emi}(n) - G_o B(n-k) - C(n) \quad [E3]$$

with:

$G_o$ is the loop gain.

$C(n)$ correction term which is equal according to the algorithm 3 to $$C(n) = Hrec(n) - Hrec(n-1)$$

with:

$Hrec(n)$ = time of receipt of the timing beacon (DIFF) by the subscriber.

Relation [E3] is equivalent to the approximation:

$$\Delta T \frac{d}{dt}(T^B tra) \approx -G_o f(t-\tau) - C(t) \quad [E4]$$

We normalize the duration of the loop round $\Delta T = 1$ time unit (Te) in the notation. [E2] and [E4] become:

$$\frac{df}{dt}(t) + G_o f(t-\tau) = \frac{dT_B}{dt}(t) - C(t) \quad [E5]$$

analog loop equation.

According to an embodiment the equations are expressed in the form of a recurrent series.

By putting:

$$u_n = T_B(n); e_n = u_n - u_{n-1}; s_n = f(n-k); c_n = C(n); kTe = \tau$$

[E3] becomes: $H^B_{emi}(n+1) = H^B_{emi}(n) - G_o s_n - c_n$ with $c_n$ correction term which takes the value $c_n = u_n - u_{n-1} = e_n$ We search for the recurrence equation for algo__03 below.

$$S_{n+k} = H^B_{emi}(n) + u_n$$

$$s_{n+k+1} = H^B_{emi}(n+1) + u_{n+1} = s_{n+k} - G_o s_n - e_n + e_{n+1} \text{ hence:}$$

$$s_n = s_{n-1} - G_o s_{n-k-1} + e_{n-k} - e_{n-k-1} \quad [E6]$$

sampled loop equation.

The analog (respectively sampled) loop equation can be analyzed with the Laplace transform (respectively Z transform) mathematical tool.

Equation [E5] is a $1^{st}$-order differential equation with pure delay, of the form:

$$y'(t) + ay(t-\tau) = c$$

Although not linear, it is possible to approximate equation [E5] by a $2^{nd}$-order differential equation. We consider a continuous slaved system with input $$e(t) = \frac{dT_B}{dt}(t)$$

and output $s(t) = f(t)$

Its transfer function may be written: $F(p) = c/(p + ae^{-\tau p})$

Let us use the bounded expansion:

$$e^x = 1 + x + \frac{x^2}{2!} + \frac{x^3}{3!} + \ldots$$

Then, $F(p) \approx c \Big/ \left(a + (1-a\tau)p + a\frac{\tau^2}{2!}p^2\right)$ We retrieve the characteristic equation corresponding to the following $2^{nd}$-order differential equation:

$$a\frac{\tau^2}{2!}y''(t) + (1-a\tau)y'(t) + ay(t) = c$$

Reminder regarding the solution of a second-order differential equation:

$$y'' + 2\lambda y' + \omega_o^2 y = c$$

with characteristic equation: $p^2 + 2\zeta\omega_o p + \omega_o^2 = 0$

There exist 3 regimes, depending on the value of the damping coefficient:

Pseudo-periodic regime ($\zeta > 1$): the system converges to its equilibrium position with oscillations whose amplitude decreases exponentially, Aperiodic regime ($\zeta > 1$), Critical regime ($\zeta = 1$): the system attains its equilibrium position quickest.

In the transient regime, in the pseudo-periodic regime, the response to a step change is given by:

$$s(t) = 1 - Ae^{-\lambda t}\sin(\omega t + \phi)$$

with the damping coefficient:

$$\zeta = \frac{\lambda}{\omega_0}, A = \frac{1}{\sqrt{1-\zeta^2}}$$

$$\omega = \sqrt{\omega_0^2 - \lambda^2} \text{ and } \varphi = \arctan\left(\frac{\sqrt{1-\zeta^2}}{\zeta}\right)$$

The response to a step change is in FIG. 5.

The response to a step change of the "long loop" can be approximated by the following Laplace transform:

$$S(p) = c \Big/ \left\{p\left(a + (1-a\tau)p + a\frac{\tau^2}{2!}p^2\right)\right\}$$

The value of the loop error ε in the steady state is obtained by applying the final value theorem:

$$\lim_{t\to\infty} s(t) = \lim_{p\to 0} pS(p).$$

Here, we have:

$$\varepsilon = c/a = \left(\frac{dT_B}{dt}(t) - C(t)\right)\Big/ G_o$$

Figure 7:
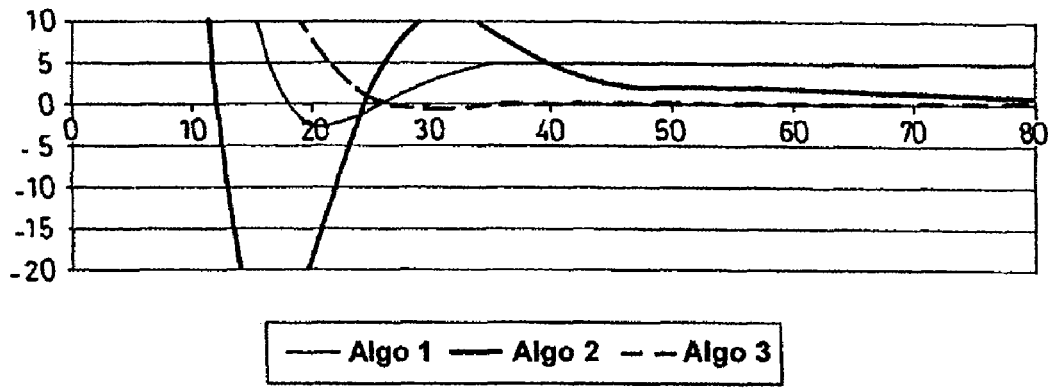
FIG. 7, simulation results comparing the convergence obtained according to the prior art and by implementing the method according to the invention, and FIG. 8, a representation of the latency in a long loop.
Figure 7:
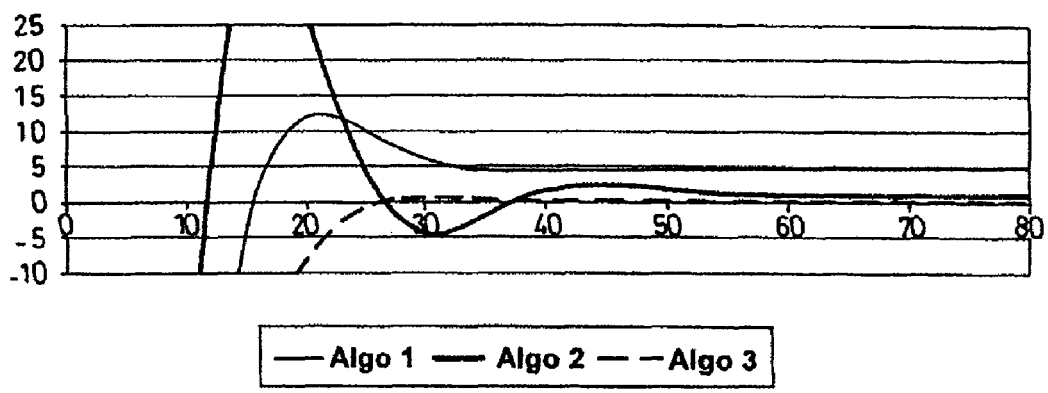

FIG. 7 compares the Convergence Times obtained with the long Loop according to the prior art, represented by Algo__01 and Algo__02 and obtained with the Long Loop obtained, implementing the method according to the invention, Algo__03, which uses the DIFF channel.

Case of Algo__01

The asymptote corresponds to the loop error ∈ in the steady state $$c/a = \frac{dT_B}{dt} \bigg/ Go.$$

For example, $$\text{for } \frac{dT_B}{dt} = 82 \text{ ns/s,}$$

for latency=4 s and for gain Go=0.25 we have ∈=0.328 μs. Onwards of Go τ=0.1, the critical regime is reached, then we have, thereafter, the aperiodic regime for lower gains.

The curves of FIG. 5 above show the shape of the loop convergence and the error according to the parameters τ and Go.

Case of Algo__02

To completely zero the error, an integrator is added to the chain.

Specifically, F(p) uncorrected is of the type $c/(a+bp+p^2)$ and the response to a step change equals S(p)=F/p hence ∈=c/a. By adding an integrator, a term 1/p is added to the differential equation, which passes back to the numerator of F(p) and which zeros the asymptotic value ∈.

Case of Algo__03

The asymptote corresponds to the steady loop error ∈

$$c/a = (1/Go)\left(\frac{dT_B}{dt} - C(t)\right)$$

With C(t)=ΔHrec(t) which tracks the variation of $T_B$.

This makes it possible to zero the steady state error.

Convergence time is gained (see comparative results of FIG. 7) and, moreover, the gain of the algorithm is independent of the channel disturbance parameters, such as the latency or the radial velocity of the satellite (given by the relative geographical position of the subscriber with respect to the satellite and by the position of the satellite in its orbital course along the eight whose form depends on the inclination of the orbital plane with respect to the equator but also the excentricity of the orbit).

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. A device for synchronizing a master station, NC, and one or more subscriber stations, NM, in a wireless communications network, comprising:
   at least one processor disposed at a level of each of the subscriber stations and configured to calculate each subscriber's transmit time adjustment by taking account of the rate of variation of a satellite-subscriber path;
   a master station side processor configured to measure the loop error; and
   a processor configured to compare a value of the loop error with a threshold value and, as soon as the value of the loop error for a subscriber station is less than or equal to the threshold value, to give said subscriber station permission to send its traffic.

2. The device as claimed in claim 1, wherein the processor configured to compare the value of the loop error with the threshold value is disposed in the master station.

3. The device as claimed in claim 1, wherein the processor configured to compare the value of the loop error with the threshold value is disposed in a subscriber station.

* * * * *